Jan. 8, 1924. 1,480,279
W. B. MacLACHLAN
VEHICLE
Filed Feb. 10, 1923 2 Sheets-Sheet 1
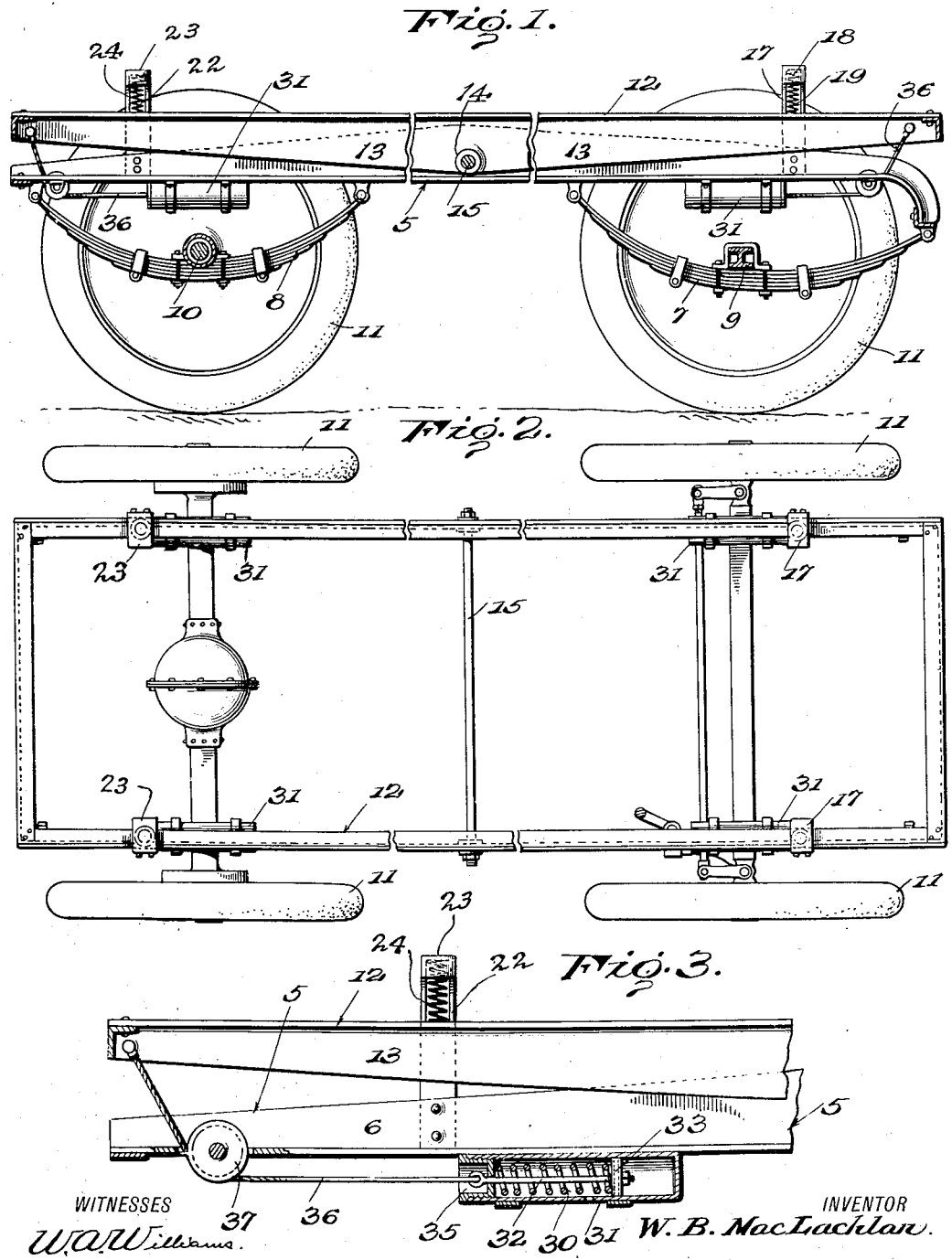

Jan. 8, 1924.

W. B. MacLACHLAN

VEHICLE

Filed Feb. 10, 1923

WITNESSES
W. A. Williams
J. G. Quesada

INVENTOR
W. B. MacLachlan
BY Munn & Co.
ATTORNEYS

Patented Jan. 8, 1924.

1,480,279

UNITED STATES PATENT OFFICE.

WILLIAM B. MacLACHLAN, OF MINNEAPOLIS, MINNESOTA.

VEHICLE.

Application filed February 10, 1923. Serial No. 618,368.

*To all whom it may concern:*

Be it known that I, WILLIAM B. MAC-LACHLAN, a citizen of the United States, and a resident of Minneapolis, in the county of Hennepin and State of Minnesota, have invented certain new and useful Improvements in Vehicles, of which the following is a specification.

This invention relates to vehicles and more particularly to the shock absorbing means for the same.

Briefly stated, an important object of this invention is to provide novel means whereby the various shocks to which a vehicle is subjected as a result of encountering inequalities in the roadway may be reduced to a minimum.

A further object of the invention is to provide a vehicle having shock absorbing means which are reliable, efficient, and cheap to manufacture.

Other objects and advantages of the invention will be apparent as the description proceeds.

In the accompanying drawings forming a part of this application and in which like numerals are employed to designate like parts throughout the same, Figure 1 is a vertical sectional view of a vehicle frame constructed in accordance with this invention, Figure 2 is a fragmentary plan view illustrating the invention, Figure 3 is a detail sectional view illustrating the shock absorbing means, Figure 4 is a fragmentary vertical sectional view illustrating a slight modification of the invention.

Figure 4:
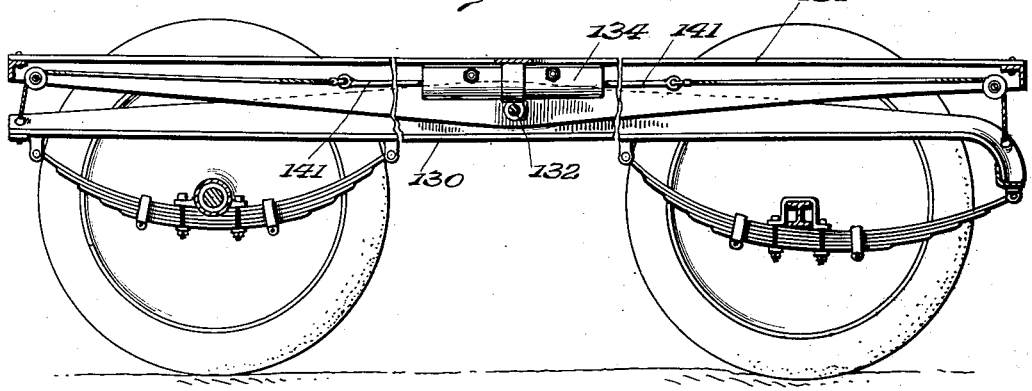

In the drawings, the numeral 5 designates a main frame having spaced parallel side beams 6 to which front and rear leaf springs 7 and 8 respectively are connected. The leaf springs 7 and 8 are in turn connected to front and rear axles 9 and 10 respectively which are connected to wheels 11.

An auxiliary frame generally designated by the numeral 12 is associated with the main frame and includes spaced parallel side beams 13 gradually enlarged towards their centers and formed with bearings 14 which receive a transversely extending shaft 15 having rotatable connection with the side beams 6 of the main frame. The shaft 15 is not necessarily connected to the central portion of the auxiliary frame 12 but is connected to the auxiliary frame at the center of balance of the load carried by the same. By connecting the shaft to the frame 12 at the center of balance the major portion of the load supported by the frame is transmitted through the shaft 15 to the frame. As illustrated in Figures 2 and 3 the rear portion of the main frame 5 is provided with upstanding brackets 17 which are substantially L-shaped in elevation and have overhanging heads 18 provided with recesses for the reception of the upper portions of coil springs 19.

The lower portions of the coil springs 19 contact with the upper side of the auxiliary frame and thereby urge the rear portion of the frame downwardly.

The forward portion of the frame is provided with L-shaped brackets 22 having inwardly directed heads 23 which receive cushioning springs 24, the lower portions of which contact with the upper side of the frame to cooperate with the rear springs 19 in positioning the frame 12 horizontally. In addition to holding the springs 19 and 24 in position the brackets 17 and 22 contact with the sides of the frame 12 and thereby prevent the same from swaying.

The body 12 is further held in position by means of pairs of front and rear secondary coil springs 30 arranged in barrels 31 secured to the under sides of the side beams 6. Plungers 32 are slidable in the barrels and are provided with heads 33 contacting with the ends of the coil springs and acting against the same. The other ends of the plungers 32 are slidable through a combined adjusting and retaining nut 35 threaded into one end of the barrel.

Each plunger 32 is connected to a cable 36 trained about a pulley 37 and connected to the adjacent end of the auxiliary frame.

In the use of the improved vehicle frame, a shock transmitted through the wheels is partly absorbed by the springs 7 and 8, and in case it is the forward wheels which are subjected to the shock the forward portion of the main frame is slightly elevated thereby elevating the intermediate portion of the several frames. When the intermediate portion of the main frame is elevated the corresponding lifting of the auxiliary frame at this point is not transmitted to the forward portion of the auxiliary frame. When the forward portion of the main frame is elevated the oppositely arranged brackets 22 are raised with the result that the coil springs 24 may expand for relieving a portion of the spring pressure on the forward portion of the auxiliary frame.

The load carried by the frame 12 is evenly balanced since any excess load on the forward portion of the frame will bear down on that portion of the frame and thereby exert an upward pressure on the rear springs 19, with the shaft 15 acting as a fulcrum.

The pair of springs 30 associated with each end of the auxiliary frame tend to urge that end of the frame downwardly in cooperation with the adjacent coil springs.

As the several springs urge the ends of the frame 12 downwardly, the said frame is normally held in a horizontal position and promptly resumes its normal position after being subjected to a shock.

Figure 5:
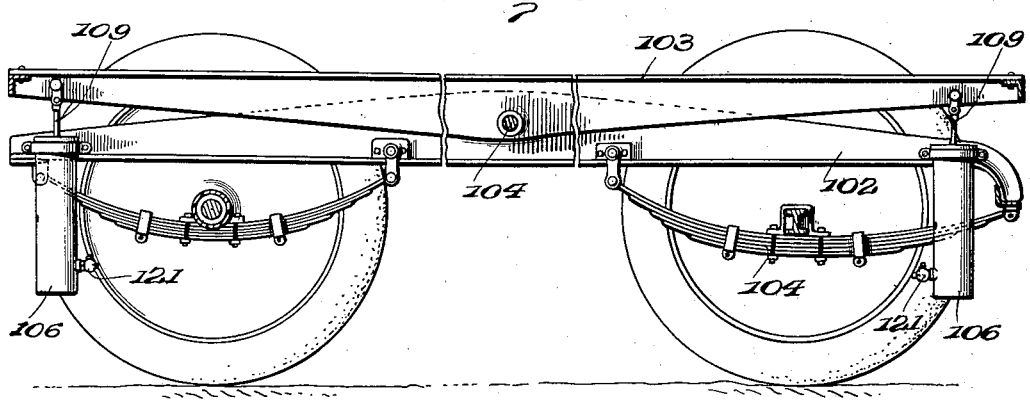
Figure 5 is a fragmentary side elevation of a further modification of the invention.
Figure 6:
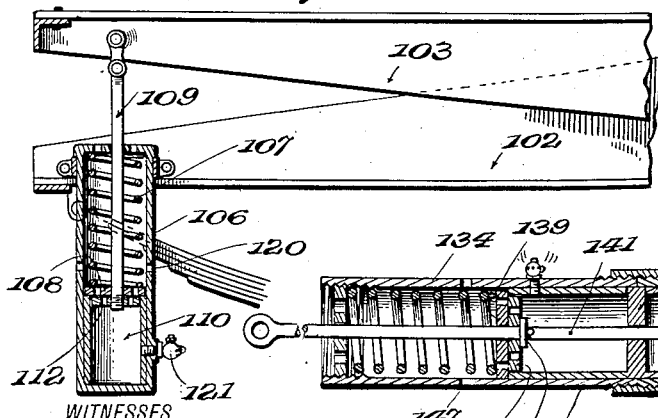
Figure 6 is a detail sectional view illustrating the form of the invention shown in Figure 5.

In the form of the invention illustrated in Figures 5 and 6, the main frame 102 is pivoted intermediate its ends to an auxiliary frame 103 as indicated at 104 and the main frame is as illustrated in Figure 5 provided with springs 104 of any desired type.

Figure 6 illustrates that the main frame 102 is provided at the end with a depending barrel or cylinder 106 which receives a coiled spring 107 adapted for controlling the movement of one frame with relation to the other.

The coiled spring 107 contacts at one end with the upper end wall of the barrel or cylinder 106 and at its other end with a spring contacting disk 108 slidably mounted upon a plunger 109. It will be observed that the disk 108 rests upon the upper end of a tubular member 110 and consequently the movement of the member 108 is positively limited in one direction and is yieldably limited in the other direction by the coiled spring 107.

The lower end of the plunger 109 is rigidly connected to a plunger head 112 slidable within the tubular member or air chamber 110.

In operation when the vehicle encounters an inequality in the roadway the main frame 102 is moved upwardly at one end and the plunger head or piston 112 is moved upwardly into engagement with the spring abutting disk 108 whereupon the spring 107 is contracted. On the return movement the piston head 112 will move downwardly in the chamber 110 against the air pressure therein and when the spring abutting disk 108 passes the opening 120 an air cushion will be formed so that the member 108 will gradually seat itself upon the upper end of the tube 110. The same is true with the cushioning mechanism at the other end of the vehicle and it will be observed that each depending cylinder 106 is provided with an air valve 121 by means of which the exit and admission of the air may be regulated.

Figure 7:
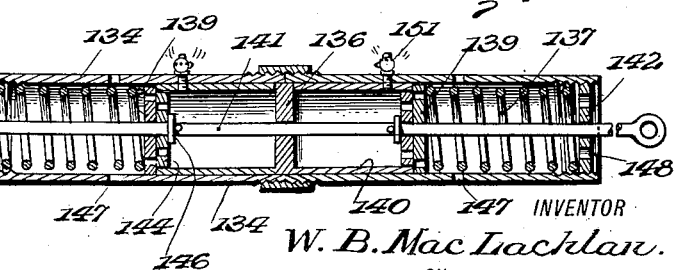
Figure 7 is a sectional view through a cushioning member illustrated in Figure 4.

In the form of the invention illustrated in Figures 4 and 7 the main frame 130 has pivotal connection with the auxiliary frame 131 as indicated at 132 and the auxiliary frame carries aligned cylinders 134 corresponding to the cylinders 106 and which are separated by a disk 136. In this form of the invention coiled springs 137 are arranged in the several aligned cylinders and contact with spring abutting disks 139 which in turn engage the ends of tubular members 140, which tubular members act to positively limit the movement of the disks 139 in one direction.

As illustrated in Figure 7 plungers 141 are slidable through the aligned cylinders and through the outer end walls 142 of the same, the intermediate portion of the plunger 141 being provided with a head 144 which is engaged by an enlargement or pin 146 on the plunger. It will be seen that when the plunger 141 is moved in one direction one of the springs 137 will be contracted and the air will be expelled by means of the openings 147 and 148. However when the disk 139 passes the opening 147 on its outward movement, all the air will be expelled by way of the openings 148. On the return movement of the disk 139 the air in advance of the disk will be expelled by way of the openings 147 and when the disk moves beyond the openings 147 an air cushion will be formed and consequently the disk 139 is gradually seated on the adjacent end of the tube 140. Of course on the inward movement of the plunger 141 the piston 144 moves inwardly against the pressure of the air within the tube 140 and the exit and admission of air in the tube 140 is controlled by means of a valve 151.

Having thus described the invention, what is claimed is:—

1. The combination with main and auxiliary frames pivotally connected intermediate their ends, of cylinders connected to the ends of said main frame, plungers connected to said auxiliary frames and having piston heads, tubular members arranged in said cylinders and having chambers slidably receiving said head, coiled springs confined between said head and the ends of said cylinders, and valves communicating with said chambers.

2. The combination with main and auxiliary frames pivotally connected intermediate their ends, of cylinders depending from the ends of the main frame, plungers connected to the ends of said auxiliary frame and having piston heads, tubular members arranged in the lower portions of said cylinders and having chambers receiving said heads, spring abutting disks mounted on said plungers and limited in their movement by contact with said tubular members, and coiled springs confined between the upper ends of said cylinders and the spring abutting disks.

WILLIAM B. MacLACHLAN.